United States Patent [19]

Dew et al.

[11] Patent Number: 5,760,361
[45] Date of Patent: Jun. 2, 1998

[54] MULTIPLE SINGLE PHASE WELD CONTROL SYSTEMS FROM A POLYPHASE POWER SOURCE

[75] Inventors: Larry A. Dew, Durham, N.C.; Thomas R. Creech, Elgin, S.C.

[73] Assignee: Square D Company, Palatine, Ill.

[21] Appl. No.: 653,213

[22] Filed: May 24, 1996

[51] Int. Cl.$^6$ .................................................. B23K 11/24
[52] U.S. Cl. .......................... 219/108; 219/110; 219/114
[58] Field of Search ............................... 219/108, 110, 219/114, 115, 116, 117.1; 361/699; 363/141

[56] References Cited

U.S. PATENT DOCUMENTS

| | | | |
|---|---|---|---|
| 5,166,491 | 11/1992 | Izume et al. | 219/110 |
| 5,449,876 | 9/1995 | Ko | 219/108 |
| 5,560,842 | 10/1996 | Kitaguchi et al. | 219/108 |
| 5,667,704 | 9/1997 | Koloziej | 219/108 |

Primary Examiner—Clifford C. Shaw
Attorney, Agent, or Firm—Michael J. Femal; Richard J. Graefe; Larry I. Golden

[57] ABSTRACT

A weld control system, supplied by a polyphase voltage source, consists of multiple and separate single phase weld controllers. The single phase weld control systems have their separate power modules combined into a single power module assembly for more efficient cooling and electrical interfacing. The single power module consists of a semiconductor switch for each phase of the polyphase voltage source and a single chiller plate for mounting and cooling the switches. The chiller plate functions as a heat sink and is machined to create a series of channels that become coupled together to form a continuous tube having a single input and a single output for a coolant liquid. A SCR pair, housed in a single package in a back-to-back configuration having an isolated base construction. The base has good thermal conductivity between the heat generating semiconductors in the package and the base. This allows the SCR packages to be mounted onto the single chiller plate and still maintain the necessary voltage isolation between each phase voltage.

14 Claims, 6 Drawing Sheets

MULTIPLE SINGLE PHASE WELD CONTROL SYSTEMS FROM A POLYPHASE POWER SOURCE

DESCRIPTION

TECHNICAL FIELD

Applicants' invention relates generally to the field of weld controllers and more particularly to multiple single phase weld controller systems powered from a polyphase power source.

RELATED APPLICATION

This application is related to the following, commonly assigned application filed concurrently herewith, entitled "Multiple Single Phase Weld Control Systems Coupled To A Polyphase Power Source" (application Ser. No. 08/653,580, Applicants Docket No. RLA-17). The contents of this Application is expressly incorporated herein by reference.

BACKGROUND ART

Resistance welding is now widely used in most applications requiring the joining of metals, such as the steel used in the manufacturing of automobiles. With the advent of the microprocessor, weld controllers have become more sophisticated and use a variety of control techniques to insure the quality of welds throughout the life of the contact tips, as they wear out. Regardless of the process or control technique used, most weld controllers consist of several basic components. These include a weld control module, a power module, a weld transformer and the contact tips. The power module usually consists of power semiconductors such as silicon controlled rectifiers (SCRs) that switch incoming power to the weld transformer according to a preset program as generated by the control module. The weld transformer will transform the incoming power to a high current pulse that is coupled to the contact tips to create a weld to a workpiece that is between the contact tips.

Since the power modules contain SCRs, heat is generated during normal operation of the system. Removing the heat buildup generally requires heat sinks for cooling and mounting the SCRs. in many industrial applications, the weld controls and other types of controllers are enclosed in non-ventilated enclosures to keep oil, dust, and other contaminants away from the controllers. Removing the heat generated by the SCRs from the enclosure can become a problem. Conventional heat sinks may not be able to remove all of the heat build-up in such an enclosure. Air conditioners and water cooled heat sinks have been found to be highly effective. However, if more than one controller is present in the enclosure, it becomes a major undertaking to connect the various water cooling systems to the water source and cooling system. This is primarily due to voltage isolation requirements between the different phase voltages and so on. For instance, if a three phase voltage source is used, which is common in industrial applications, to provide power to three separate single phase weld controllers, three separate heat sinks are required. A complicated water circulation cooling system also is required.

It would be desirable to develop a system or method whereby a single cooling plate or heat sink can be utilized for the three separate systems to reduce the complexity Df the system. The system becomes more cost effective and requires less space.

SUMMARY OF THE INVENTION

Accordingly, the principal object of the present invention is to provide a weld control system, supplied by a polyphase voltage source, having separate single phase weld controllers.

A further objective of the invention is to provide an apparatus and method for reducing the complexity of interfacing three single phase weld control systems supplied from a polyphase voltage source, by combining the separate power modules of each weld control system into a single power module assembly for more efficient cooling and electrical interfacing.

In the preferred embodiment of the invention, the invention is comprised of a system of essential elements including, but not limited to, a weld control module, a power module, a weld transformer and contact tips for each phase of the polyphase voltage source. The power module consists of power semiconductors such as silicon controlled rectifiers (SCRs) that switch incoming power to the weld transformer according to a preset program as generated by the control module. The weld transformer will transform the incoming power to a high current pulse that is coupled to the contact tips to create a weld to a workpiece that is between the contact tips.

Each power module is a semiconductor switch consisting of a SCR pair for each phase of the polyphase voltage source. A single chiller plate is used for mounting and cooling all of power modules. The chiller plate functions as a heat sink and is machined to create a series of channels that become coupled together to form a continuous cooling tube having a single input and a single output. A coolant is circulated through the tube to provide cooling for the SCRs. Each SCR pair is housed in a single package in a back-to-back configuration well known to those skilled in the art. The main requirement for these SCR packages is that they have the isolated base construction. The line and output voltage is isolated from the base or mounting surface of the package, yet the base has good thermal conductivity between the heat generating semiconductors in the package and the base. This allows the SCR packages to be mounted onto the single chiller plate and still maintain the necessary voltage isolation between each phase voltage.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
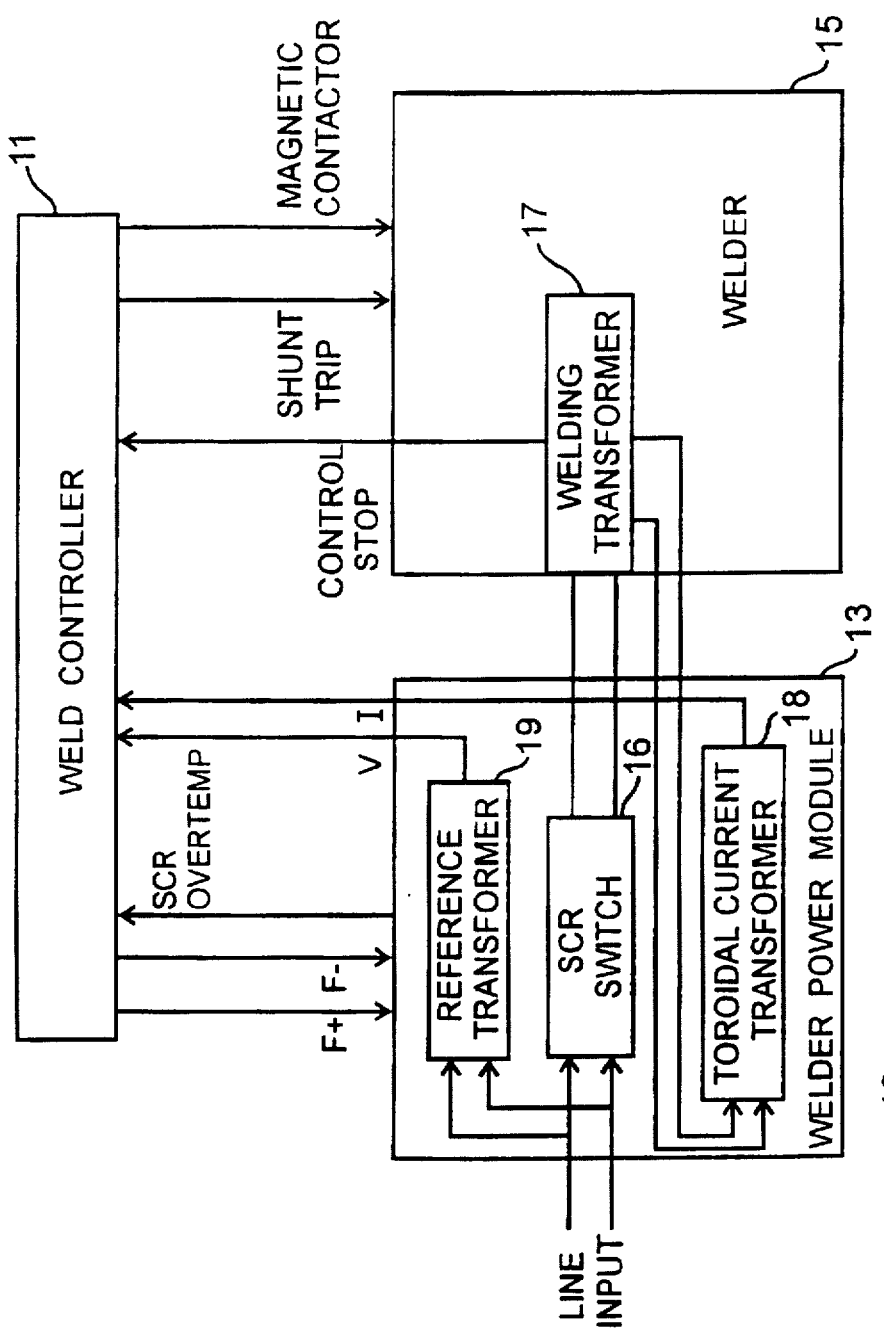
FIG. 1 is a block diagram showing a typical welder and weld controller system.

FIG. 1 illustrates a typical welder system 10 consisting of a weld controller 11, a welder power module 13, and a welder 15. Weld controller 11 generates firing signals F+ and F− used to energize or turn on SCR switch 16 which is coupled to welding transformer 17 to supply power to contact tips and the workpiece being welded. The primary current of welding transformer 17 is monitored by using a toroidal current transformer 18 coupled to its primary circuit. A reference transformer 19 monitors the incoming line input voltage. In addition to voltage V and current I signals, weld controller 11 receives an over-temperature signal from the SCR switch 16 for use in control algorithms within the weld controller 11 as a protective feature to control or shutdown the welder 10 if the SCR switch reaches a predetermined temperature. Specific implementation details of welder system 10 may be found in U.S. Pat. No. 4,945,201, although such details are not necessarily required for a correct understanding of the present invention.

Figure 2:
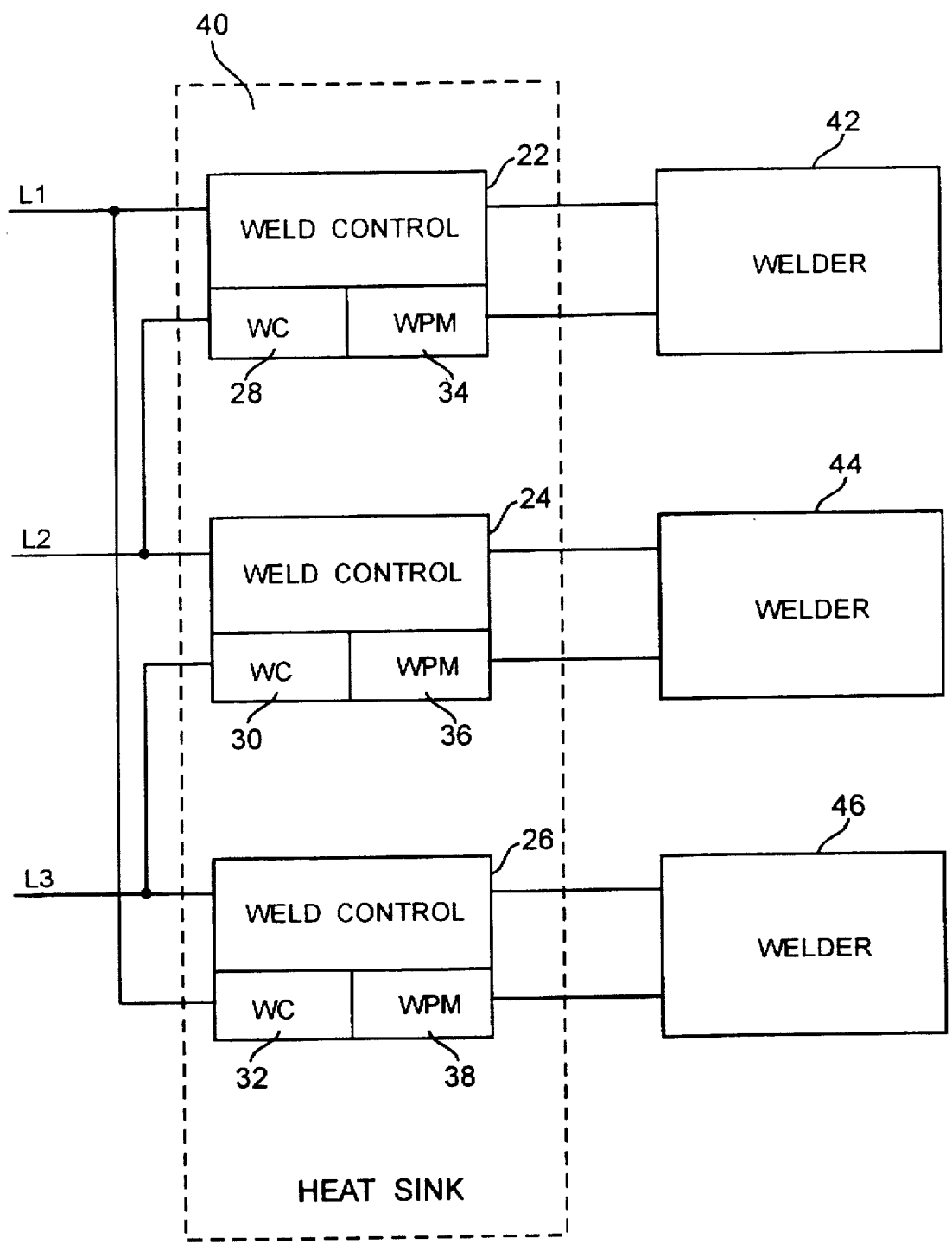
FIG. 2 is a block diagram showing a polyphase voltage source supplying power to single phase weld controller systems according to the present invention.

A polyphase voltage source L1, L2, L3 supplying power to a weld control system 20 comprised of single phase weld controls 22, 24, 26 is detailed in FIG. 2 in block diagram form. Each weld control 22, 24, 26 consists of a weld controller 28, 30, and 32 and a welder power module 34, 36, 38, respectively, as referenced as weld controller 11 and weld power module 15 shown in FIG. 1. Each weld controller 28, 30, 32 generates firing signals used to energize or turn on the semiconductor switch 16 contained in its respective weld power module. The weld controls may operate in synchronization with each other or independently. Weld controls 22, 24, 26 are mounted on a single heat sink or chiller plate 40. Semiconductor switch 16 consists of a SCR pair for each phase of the polyphase voltage source. Each SCR pair is housed in a single package in a back-to-back configuration. The SCR packages have an isolated base construction and are mounted directly to the single chiller plate 40 for cooling the SCR pairs. The chiller plate 40 functions as a heat sink and is machined to create a series of channels that are coupled together to form a continuous coolant tube having a single input and a single output, as will be detailed below. The coolant is typically water, but other liquids could be used as well. The line voltages L1, L2, and L3 and output voltages V1, V2, and V3 are isolated from the base or mounting surface of the SCR packages. Each welder 42, 44, and 46 contains a welding transformer 17 coupled to V1, V2, V3, respectively, which supply welding current to their workpieces.

Figure 3:
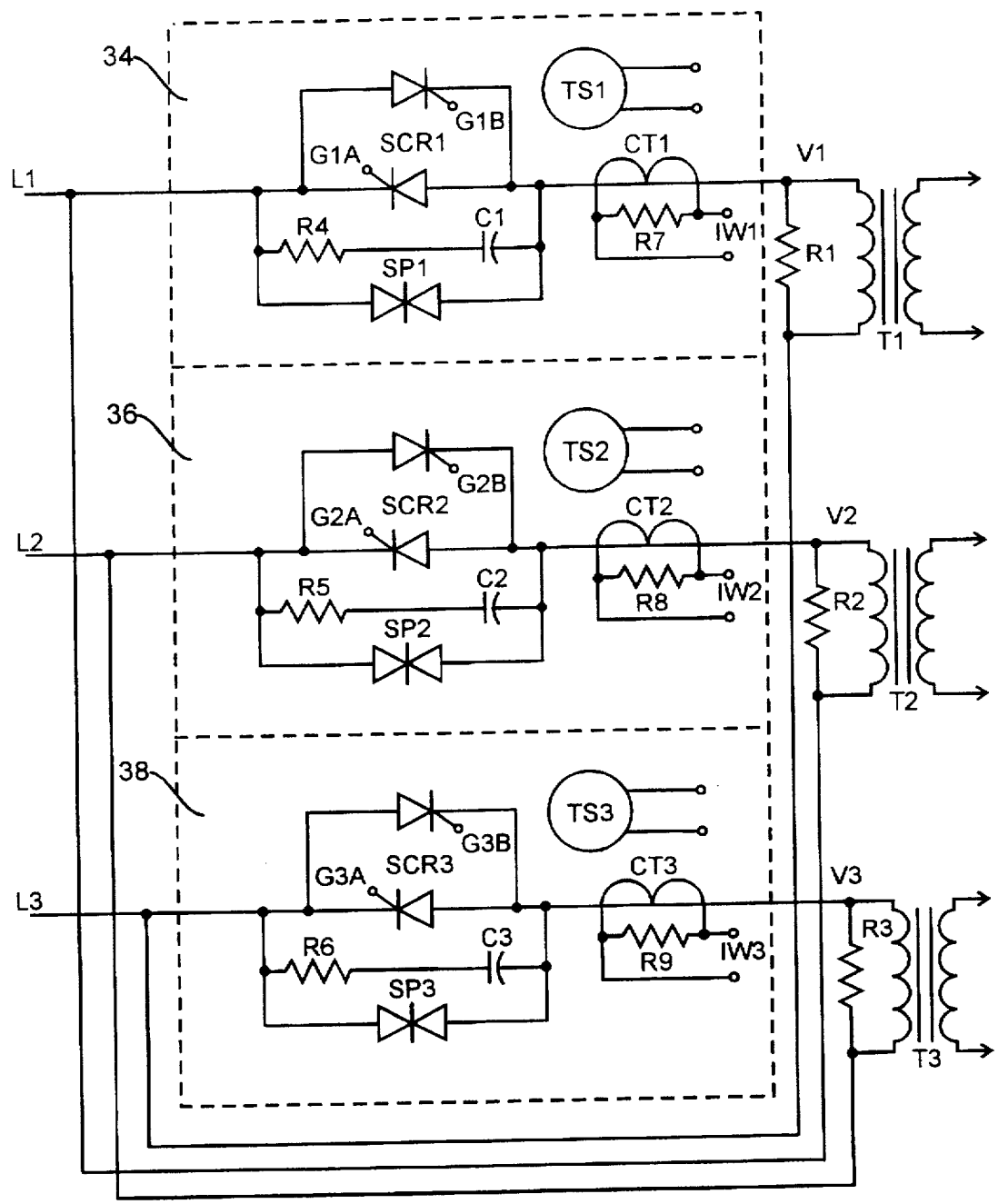
FIG. 3 is a simplified schematic diagram showing the polyphase weld controller system illustrated in FIG. 2 according to the present invention.

FIG. 3 is a simplified schematic diagram showing the polyphase weld controller system illustrated in FIG. 2 according to the present invention. Weld power modules 34, 36 and 38 are functionally identical. Each module consists of a SCR pair, a snubber network, a current sensor and a temperature sensor. SCR1 gates G1A and G1B receive firing signals from weld controller 28, SCR2 gates G2A and G2B receive firing signals from weld controller 30, and SCR3 gates G3A and G3B receive firing signals from weld controller 32. These firing signals are generated using a variety of control techniques to insure the quality of welds throughout the life of the contact tips, as they wear out and are not the object of the present invention. Regardless of the process or control technique used, the SCRs will switch incoming power to the weld transformer according to a preset program as generated by the control modules. SCR1 switches incoming line L1 to one leg of welding transformer T1. Similarly, SCR2 switches incoming line L2 to one leg of welding transformer T2, and SCR3 switches incoming line L3 to one leg of welding transformer T3. Current transformers CT1, CT2, and CT3 provide voltage signals across burden resistors R7–9 that are proportional to the welding currents IW1, IW2, and IW3 for use in the particular control scheme used. Thus, weld transformer T1 is supplied with a voltage V1 across resistor R1 that is in phase with L1–L3, weld transformer T2 is supplied with a voltage V2 across R2 in phase with L2–L1, and weld transformer T3 is supplied with a voltage V3 across R3 in phase with L3–L2. Snubber networks across the SCR pairs consist of a resistor R4–R6, a capacitor C1–C3 and a transient voltage suppresser SP1–SP3. Adjacent to each SCR pair is a temperature sensor TS1–3. These sensors will generally provide a closed circuit as long as the temperature does not exceed a predetermined set point, indicating that the SCR switches are operating within normal operating limits. If a temperature is exceeded, the TS switch will open and the weld controller will react appropriately.

Figure 4:
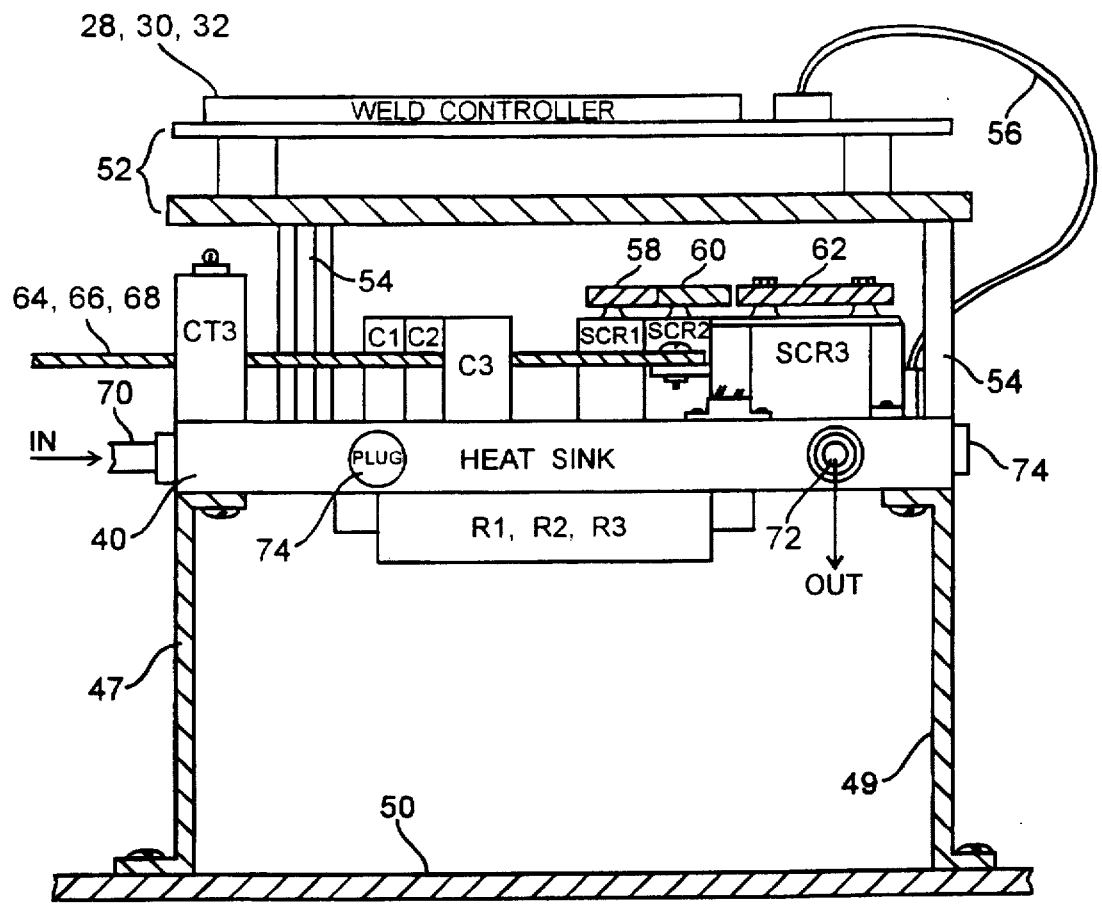
FIG. 4 is a simplified side view of a weld controller system illustrated in FIG. 2 constructed according to the present invention.

Referring to FIG. 4, the weld controller system illustrated in FIG. 3 is shown in a simplified side view as constructed according to the present invention. The heat sink assembly 40 is attached to a panel 50 by brackets 47 and 49. The weld controllers 28, 30, 32 are located on circuit boards 52 and are supported above the heat sink 40 by standoffs 54 and 56. Control signals, including firing commands, line voltages, weld currents, and temperature, are coupled to the circuit boards by cables 56 from the heat sink assembly 40. Attached to the heat sink 40 are the current transformers CT1–3, temperature sensors TS1–3, snubber networks C1–3, and SCR pairs 1–3. Bus bars 58, 60, and 62 couple line voltages L1–L3 to the SCR pairs. Bus bars 64, 66, and 68, which are inserted through their respective current transformers, provide a connection point for the output voltages V1–V3 from the SCR pairs. Standoffs 54 also provide support for the bus bars. Resistors R1–R3 are mounted below the heat sink 40. A connector 70 provides a means of coupling the source of the coolant to the heat sink 40. Likewise, a connector 72 provides a means of coupling the drain of the coolant from the heat sink 40. Plugs 74 are used to create the single coolant channel, as will be discussed below.

Figure 5:
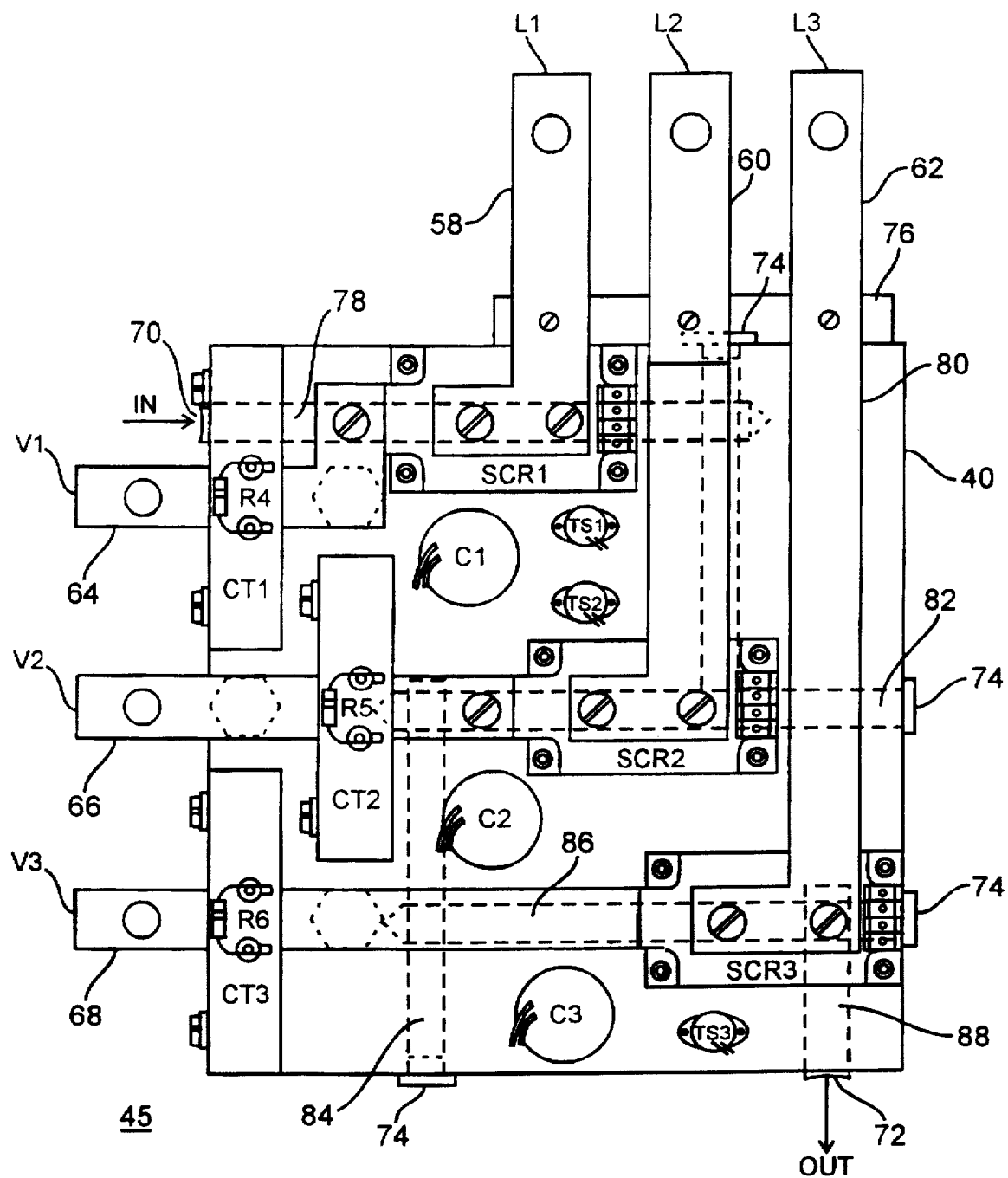
FIG. 5 is a simplified top view of the polyphase weld controller system illustrated in Fig.4 constructed according to the present invention.

A simplified top view of the polyphase weld controller system of Fig. 4 is illustrated in FIG. 5, as constructed according to the preferred embodiment of the present invention. Tapped holes, not shown, are located as needed to mount the SCR pairs SCR1–SCR3, the current transformers CT1–CT3, the thermostats TS1–TS3, and the snubber capacitors C1–C3 to heatsink 40. An insulated support bracket 76 provides mounting for and is located under bus bars 58, 60, and 62. Thusly constructed, L1 is coupled to SCR1 by bus bar 58, L2 is coupled to SCR2 by bus bar 60, and L3 is coupled to SCR3 by bus bar 62. Spacers 54 are used to support and secure the output bus bars in a similar manner. Bus bar 64, which is inserted through CT1, provides an external connection for the output V1 of SCR1. Bus bar 66, which is inserted through CT2, provides an external connection for the output V2 of SCR2. Likewise, bus bar 68, which is inserted through CT3, provides an external connection for the output V3 of SCR3.

The heatsink 40 is machined with internal channels 78, 80, 82, 84, 86, and 88 to form the cooling channel. Plugs 74 are used to close the external ends of channels 80, 82, 84, and 86. A connector or fitting 70 is coupled to the external end of channel 78 to accept an incoming coolant line. Similarly, the external end of channel 88 is fitted with a connector or fitting 72 to accept an outgoing drain line.

With this configuration, the channels are interconnected and provide a continuous tube from input to output. To maximize heat extraction, channel 78 is directly below SCR1, channel 82 is below SCR2, and channel 86 is directly below SCR3.

Figure 6:
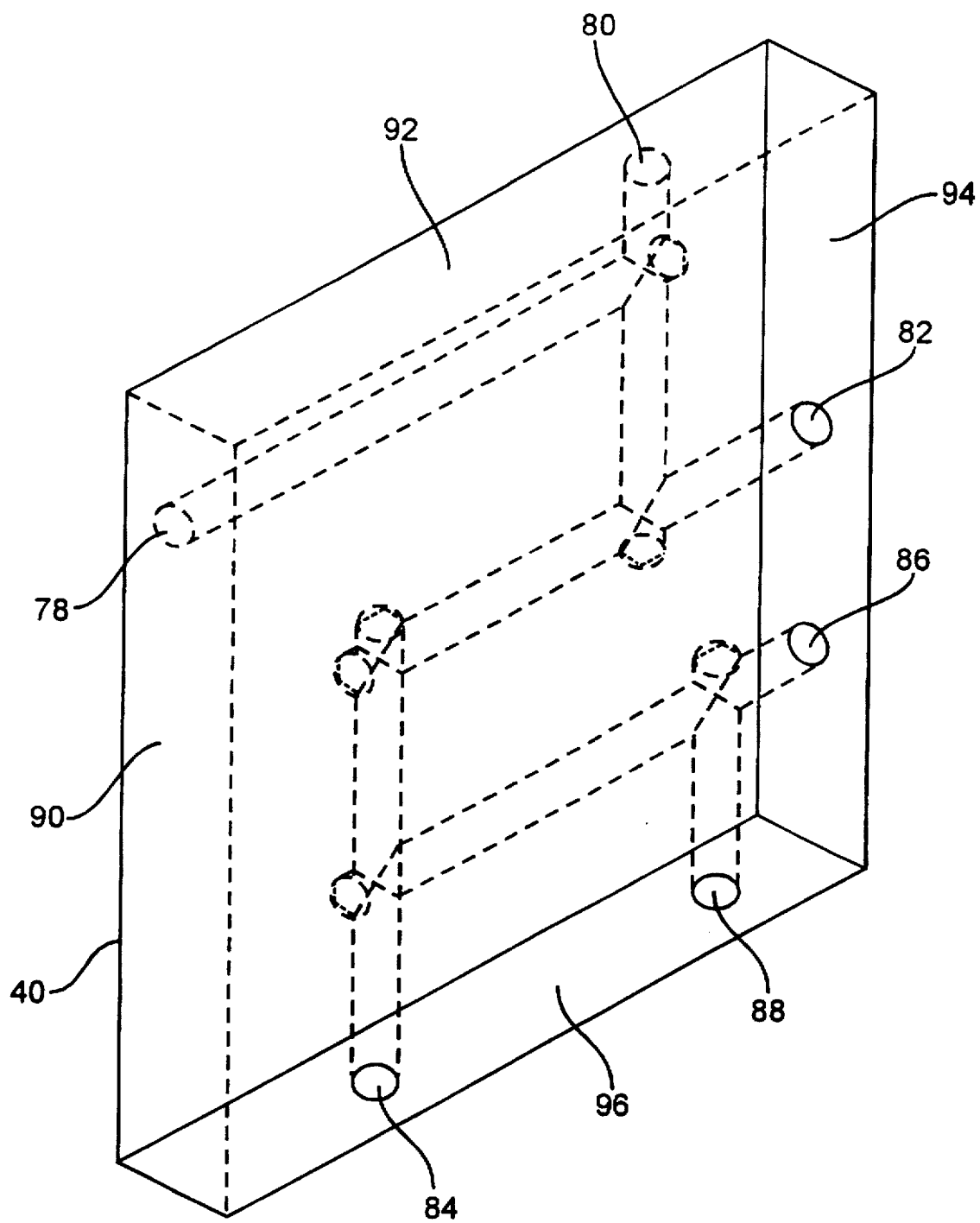
FIG. 6 is a simplified isometric view of a chiller plate used in the weld controller system illustrated in FIG. 5 constructed according to the present invention.

Details of the channel machining of the chiller plate or heat sink 40 used in the weld controller system constructed according to the present invention is shown in FIG. 6. The heat sink 80 is a rectangular shaped block of aluminum having left side 90, top side 92, right side 94, and bottom side 96. Although aluminum is the preferred material, other metals or heat conductive materials could also be used. Channel 78 is machined from the left side 90 at a point that is centered below the mounting of SCR1. Channels 82 and 86 are machined from the right side 94 in parallel with channel 78 and also centered below SCR2 and SCR3, respectively. Channel 80 is machined from the top side 80 such that it intersects channels 78 and 82. Channels 82 and 86 are connected by the intersection of channel 84 which is machined from the bottom side 96. Although the external end of channel 86 on the left side 94 can be used as the outlet, it is usually more convenient in the final assembly to have the coolant flow from the bottom side 96 of the heatsink 40. Channel 88 accomplishes this by its intersection with channel 86. The external ends may be tapped to allow the fittings 70 and 72 and plugs 74 to be attached to the heatsink in final assembly.

While the specific embodiments have been illustrated and described, numerous modifications are possible without departing from the scope or spirit of the invention.

We claim:

1. A weld control system supplied by a polyphase voltage source and having a plurality of separate single phase weld controllers, said weld control system comprising:
   A. a weld controller circuit for each single phase weld controller;
   B. a welder power module for each single phase weld controller, said welder power module coupled to said voltage source and controlled by a program operating in said weld controller circuit;
   C. a weld transformer operatively connected to said welder power module for each single phase weld controller, said weld transformer for supplying weld current from said polyphase voltage source to a pair of contact tips to create heat in a workpiece following predetermined switching of said welder power modules controlled by said program; and
   D. a single chiller plate for mounting and cooling all of said welder power modules, said chiller plate including a formed coolant channel for circulating a liquid to remove heat generated by said weld power modules.

2. The weld control system of claim 1 wherein said polyphase voltage source is a three phase voltage.

3. The weld control system of claim 2 wherein each of said welder power modules is a SCR pair, housed in a single package in a back-to-back configuration and having an isolated base construction for mounting to said chiller plate.

4. The weld control system of claim 3 wherein said chiller plate is formed from a rectangular metal block, having a top, a bottom, and four sides.

5. The weld control system of claim 4 wherein said formed coolant channel in said chiller plate is machined by boring a first series of parallel channels from opposite sides of said metal block, and boring a second series of parallel channels from opposite sides perpendicular to and intersecting said first series of parallel channels.

6. The weld control system of claim 5 wherein said metal block is aluminum.

7. A single heat sink assembly for use in a weld control system supplied by a polyphase voltage source and having a plurality of separate single phase weld controllers, each separate weld controller including a weld transformer for supplying weld current to a pair of contact tips to create heat in a workpiece following predetermined steps in a welder program; said heat sink assembly comprising:
   A. a weld controller circuit for generating said welder program operating in said weld controller for each single phase weld controller;
   B. a welder power module for each single phase weld controller, said welder power module operatively connected between said polyphase voltage source and its respective weld transformer, said welder power module controlled by said welder program to supply said voltage source following said predetermined steps in said welder program to said weld transformer; and
   C. a single chiller plate for mounting and cooling all of said welder power modules, said chiller plate including a formed coolant channel for circulating a liquid to remove heat generated by said weld power modules.

8. The heat sink assembly of claim 7 wherein each of said welder power modules is a SCR pair, housed in a single package in a back-to-back configuration and having an isolated base construction for attaching to said chiller plate.

9. The heat sink assembly of claim 8 wherein said chiller plate is formed from a rectangular metal block, having a top, a bottom, and four sides.

10. The heat sink assembly of claim 9 wherein said formed coolant channel in said chiller plate is machined by boring a first series of parallel channels from opposite sides of said metal block, and boring a second series of parallel channels from opposite sides perpendicular to and intersecting said first series of parallel channels.

11. The heat sink assembly of claim 10 wherein said first series of parallel channels are located below and parallel with said welder power modules.

12. The heat sink assembly of claim 10 wherein said metal block is aluminum.

13. The heat sink assembly of claim 10 further including a transient voltage suppressor assembly coupled across each of said welder power modules.

14. The heat sink assembly of claim 10 further including a temperature sensor for each welder power module to protect said heat sink assembly from overtemperature conditions.

* * * * *